United States Patent [19]

Henriksson

[11] Patent Number: 4,731,801

[45] Date of Patent: Mar. 15, 1988

[54] METHOD FOR THE RECEPTION AND DETECTION OF DIGITAL SIGNALS

[75] Inventor: Jukka Henriksson, Espoo, Finland

[73] Assignee: Oy Nokia Ab, Helsinki, Finland

[21] Appl. No.: 795,239

[22] Filed: Nov. 5, 1985

[30] Foreign Application Priority Data

Dec. 5, 1984 [FI] Finland .................................. 844810

[51] Int. Cl.[4] .............................................. H04B 1/10
[52] U.S. Cl. .................................... 375/100; 375/102
[58] Field of Search .................. 375/100, 39, 40, 102; 455/139

[56] References Cited

U.S. PATENT DOCUMENTS

| | | | |
|---|---|---|---|
| 3,633,107 | 1/1972 | Brady | 375/40 |
| 3,651,406 | 3/1972 | Mohr et al. | 375/102 |
| 4,528,674 | 7/1985 | Sweeney et al. | 375/102 |

OTHER PUBLICATIONS

Microwave Mobile Communications, W. C. James (ed.), John Wiley & Sons, New York, 1974, p. 642.
Feher K., Chan D.: PSK Combine for Fading Microwave Channels, IEEE Transactions on Communications, May 1975, ss. 554 . . . 7.
Lindsey, W. C., Simon, M. K.: Telecommunication Systems Engineering, Prentice-Hall, Inc., Englewood Cliffs, 1973, p. 574.
Lucky, R. W., Salz, J., Welden, E. J.: Principles of Data Communication, McGraw-Hill, 1968, 4335.
Komaki, S., Yoshiharu, O., Kojiro, T.: Performance of 16-QAM Digital Radio Systems Using New Space Diversity, ICC-80, pp. 52.2.1 . . . 52.2.6.
Van Trees, H. L.: Detection, Estimation and Modulation Theory, pt. III, John Wiley & Sons, New York, 1971, p. 626.

Primary Examiner—Robert L. Griffin
Assistant Examiner—Marianne Huseman
Attorney, Agent, or Firm—Birch, Stewart, Kolasch & Birch

[57] ABSTRACT

Described herein is a method for the reception and the detection of digital signals. According to the method at least two signals ($s_1, s_2, \ldots, s_M$) having at least approximately the same information content are received and out of each received signal ($S_i$) is generated by means of a phase shift one in-phase baseband signal ($s_{iI}$) and one quadrature baseband signal ($s_{iQ}$). All in-phase baseband signals ($s_{iI}$) are summed in a first summing point (3a) and all quadrature baseband signals ($s_{iQ}$) in a second summing point (3b), both sum signals ($y_{Ik}$ and $y_{Qk}$) are fed to a detector (4) for detection and generating two detected output signals ($s_{Ik}$ and $s_{Qk}$), and a reference carrier (ca) is generated as a function of said two sum signals ($y_{Ik}$ and $y_{Qk}$) for carrying out a coherent demodulation. According to the invention a projection voltage ($z_k$) defined by the equation $z_k = y_{Qk}s_{Ik} - y_{Ik}s_{Qk}$ is generated, wherein $y_{Ik}$ is a signal sample in the in-phase branch before threshold decision in the detector, $y_{Qk}$ is the signal sample in the quadrature branch before decision, $s_{Ik}$ is the detected signal in the in-phase branch, and $s_{Qk}$ is the detected signal in the quadrature branch.

11 Claims, 16 Drawing Figures

METHOD FOR THE RECEPTION AND DETECTION OF DIGITAL SIGNALS

The invention concerns a method for the reception and detection of digital signals and is intended for application especially in the context of radio-relay systems employing diversity reception. The method involves summation of one or more received (phase modulated or phase and amplitude modulated) pulse trains, for which summation operation weighting coefficients are generated by previously received and demodulated signals.

In this connection reference is made to the following literature:

(1) Microwave mobile communications. W. C. Jakes (ed.) John Wiley & Sons, New York 1974, 642 p.

(2) Feher K., Chan D.: PSK combine for fading microwave channels. IEEE Transactions on communications, May 1975, ss. 554 ... 7.

(3) Lindsey W. C., Simon M. K.: Telecommunication systems engineering. Prentice-Hall, Inc., Englewood Cliffs 1973, 574 p.

(4) U.S. Pat. No. 4,271,525, Watanabe K. June 2, 1981, Nippon Electric Co., Japan.

(5) Lucky R. W, Salz J., Weldon E. J.: Principles of data communication McGraw-Hill 1968, 4335

(6) Komaki S., Yoshiharu O., Kojiro T.: Performance of 16-QAM digital radio systems using new space diversity ICC-80, pp. 52.2.1 ... 6.

(7) Van Trees H. L.: Detection, estimation and modulation theory, pt. III. John Wiley & Sons, New York 1971, 626 p.

The purpose of the method of diversity reception is to secure the best signal possible under conditions of multipath fading. The use of diversity reception for such a purpose is exemplified by Ref. (1), pages 423 to 489 (for analog signals) and Ref. (2) (for digital, phase-modulated signals).

The method described is also applicable to equalizers using transversal filtering in which the previously known criteria of optimization (minimum square error, zero forcing method, Ref. (5), pages 147-156) are replaced by the previously unused criterion or minimum projection.

Figure 1:
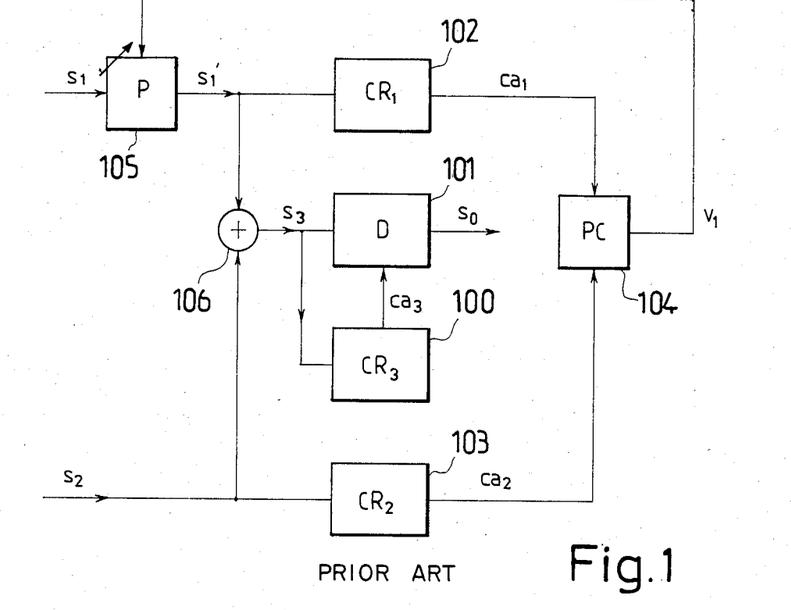
FIG. 1 is a block diagram of a system for combining and demodulating analog and digital signals according to known principles.

Currently known systems for combining and demodulating analog and digital signals follow a principle illustrated by FIG. 1, in accordance with References (1) and (2).

Signals $s_1$ and $s_2$ coming to the receiver are APSK modulated. Signal $s_1$ is brought to phase shifter 105 producing phase change $\theta$ in the signal now denoted $s'_1$. Signals $s'_1$ and $s_2$ are taken to summing network 106, which produces signal $s_3$, equal to $s'_1+s_2$. The carrier is extracted from signal $s_3$ by carrier regenerator 100 (using e.g., nonlinearity+filtering method or Costas loop, Ref. (3). The carrier $ca_3$ is employed for coherent demodulation in demodulator 101. In order to obtain in-phase signals, to be combined in the summing network 106, carriers corresponding to signals $s'_1$ and $s_2$ are generated by means of carrier regenerators 102 and 103. The carriers $ca_1$ and $ca_2$ obtained are taken to phase comparator 104 whose output $v_1$ is zero when $ca_1$ and $ca_2$ are in phase.

Thus adjustments in the phase shifter 105 are concluded when the carriers of signals $s'_1$ and $s_2$ are in phase and the sum signal $s_3$ is maximized.

A number of practical solutions are known for the operation described, all characterized by phase recovery of signals $s'_1$ and $s_2$ on the basis of sine-wave signals carrier frequency.

In addition to the above, methods of diversity reception specifically for digital signals have been proposed. These techniques make use of already demodulated signals. Familiar applications of this principle include those of Ref. (4) characterized by attempts to minimize the mean square error at the decision making point by means of special diversity arrangements. In Ref. (4), this is effected by using matched adaptive equalizers in each diversity branch.

In addition, schemes are known in which the phase adjustments of diversity combining operations follow the combined signal spectrum to provide a spectrum of maximum flatness, Ref. (6). The aim is one of minimum dispersion combination. Demodulated symbols of a digital signal are thus not used.

The commonly used schemes employing diversity combining based on carriers kept in phase, do not produce optimal results under conditions of a highly dispersive transmission path (multipath propagation, selective fading).

The said techniques do not take into account the interaction between signals in phase and quadrature branches leading to an increased probability of errors in digital transmission.

Methods based on minimizing the mean square error appearing at the decision making point give results better than those mentioned above, but even they do not make optimum use of the nature of the digital modulation applied. The mean square error as a criterion for optimization is not fully compatible with the form of the decision area. This is significant especially during deep selective fades.

Methods using minimum dispersion combining and solely based on following the signal spectrum do not necessarily produce low error probability in all instances. Such a system is often technically complex to realize.

The purpose of the present invention is to avoid the drawbacks related to the above prior art and to provide an entirely new method for the reception and detection of digital signals.

The method according to the invention is based on the following ideas:

The method makes use of a demodulator employing diversity reception of APSK signals.

The method minimizes the mean square deviation, or minimum projection, which is a new criterion for optimization (cf. the familiar mean square error).

The demodulator makes use of a decision directed loop to generate the reference carrier. This is almost indispensable for the generation of projection control increments.

The received signals in all, or in all but one, branches are effected by phase shifters or combination phase and amplitude shifters (weighting elements) before or after the demodulation but before the summation of the diversity signals.

Control of weighting elements is based on decisions made during demodulation.

Control of weighting elements is obtained by multiplying with each other.

(a) instantaneous control increments (projections) of the decision controlled loop and (b₁) the product of the remodulated combiner sum and the branch signal preceding the weighting element (low-pass filtered), or (b₂) the product of the combiner sum (remodulated or base-band) and the branch signal after the weighting element (bandpass or baseband) (low-pass filtered), (b₃) (in the case of two branches) the product of both branch signals appearing at the summing point (low-pass filtered) or, by making technical modifications to obtain the mathematically equivalent functions. Especially, products of two bandpass signals can be substituted by a combination of products and sums of four baseband signals.

The method is a mixture of minimum dispersive and maximal ratio combining techniques. When dispersion is negligible, the branches are weighted on the principle of maximum ratio whereas in conditions of high dispersion the branch signals are combined so as to minimize the effect of dispersion components.

The most significant feature of the method described is the utilization of projection quantity $z_k$ for the control of the weighting elements. The projection $z_k$ is obtained from the formula $$z_k = y_{Qk} s_{Ik} - y_{Ik} s_{Qk}$$

where $y_{Ik}$ is the signal sample at the phase branch before demodulation $y_{Qk}$ is the signal sample at the quadrature branch $s_{Ik}$ is the demodulated signal at the phase branch $s_{Qk}$ is the demodulated signal at the quadrature branch The method is also applicable to equalizers making use of transversal filters. The tap weights are then controlled based on the minimum projection principle.

In more accurate terms, the method according to the invention is characterized by what is stated in claim 1. Under normal conditions of no fading, the proposed solution of diversity combination produces results similar to those obtained by using the earlier solutions. The advantages of the invention are apparent on a highly dispersive, selectively faded channel, when the receiver receives, in addition to the main signal, delayed signals of changed amplitude and phase. The receiver then combines the diversity branches (or adjusts the the equalizer coefficients) so as to minimize the combined disturbance of noise and interference in the minimum projection sense. Especially during periods of deep fading, the elimination of dispersion components by means of the system described improves the performance of the receiver in relation to that obtainable by using conventional methods.

The method accordings to the invention is technically less complicated than some other methods, such as that referred to in Ref. (6), in which other forms of control are used to obtain a result characterized by minimum dispersion.

The criterion for control, minimum projection, is of nature very close to error probability, a performance measure commonly used in digital transmission. The principle of optimization according to the invention therefore leads to a favourable result in terms of error probability.

The invention relaxes the requirement to compensate for differences of delay in the diversity branches because the resulting phase differences are automatically taken into account in the phase shifters.

The invention relaxes the requirements for receiver timing because the diversity branches are optimally combined for each timing phase, resulting in an extended range of usable timing variation.

The invention will now be described in more detail, reference being made to the FIGS. 2 to 16.

Figure 2:
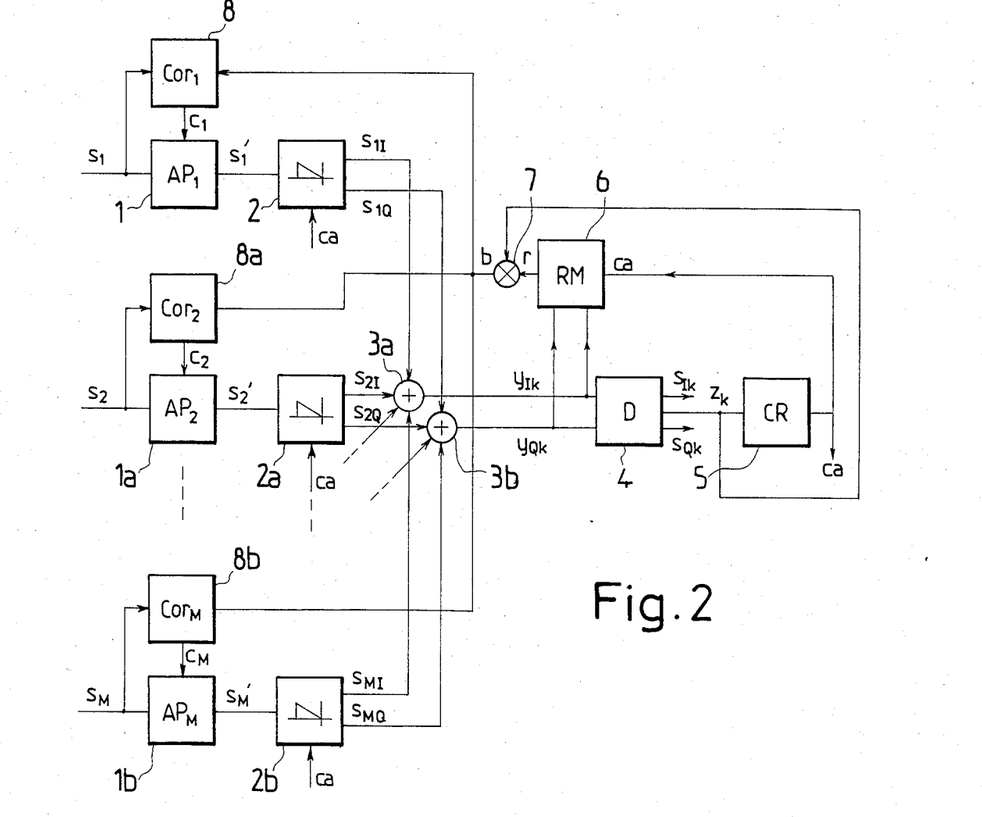
FIG. 2 is a block diagram showing the general principle of the invention.

Consider a diversity receiver which uses digital quadrature modulation and which has a block diagram as given in FIG. 2. M signals $s_1 \ldots s_M$ are simultaneously received, e.g., from separate antennae or from taps in a transversal equalizer delay line. To each of these signals (or to each but one, which will be discussed later) an amplitude and phase shift, or only phase shift, is caused by devices $AP_1, \ldots AP_{M-1}(AP_M)$. The processed (shifted) signals $S_M'$ are fed to the demodulators 2, whose outputs will be the baseband in-phase signals $s_{mI}$ and the quadrature signals $s_{mQ}$, m runs from 1 to M. The demodulators 2 can be of conventional type, such as given in FIG. 3.

Figure 3:
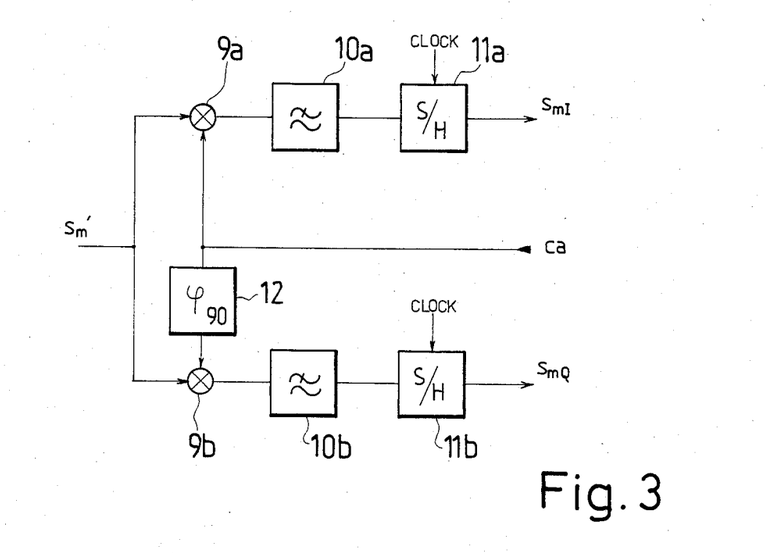
FIG. 3 is a block diagram of a typical demodulator, block 2.

The demodulator in FIG. 3 consists of multipliers 9a and 9b (e.g. balanced mixers), low-pass type receiving filters 10a and 10b, and sample and hold circuits 11a and 11b. The carrier ca from the carrier regenerator 5 is fed to the multiplier 9a directly and to the multiplier 9b through the 90 degrees phase shifter. The upper path processes the in-phase signals and the output is the in-phase analog sample $s_{mI}$ while the output of the lower path is the quadrature analog sample $s_{mQ}$. The analog samples are the demodulated baseband signals of the diversity branches.

The demodulated baseband signals $s_{mI}$ and $s_{mQ}$ of the diversity branches are fed to a combiner (FIG. 2), where the in-phase signals are summed at the summing point 3a and the quadrature signals at the summing point 3b. The sum signals $y_{Ik}$ and $y_{Qk}$ are fed to the detector circuit 4, whose outputs are the detected in-phase symbols $s_{Ik}$, detected quadrature symbols $s_{Qk}$ and the projection voltage $z_k$.

Figures 4, 5:
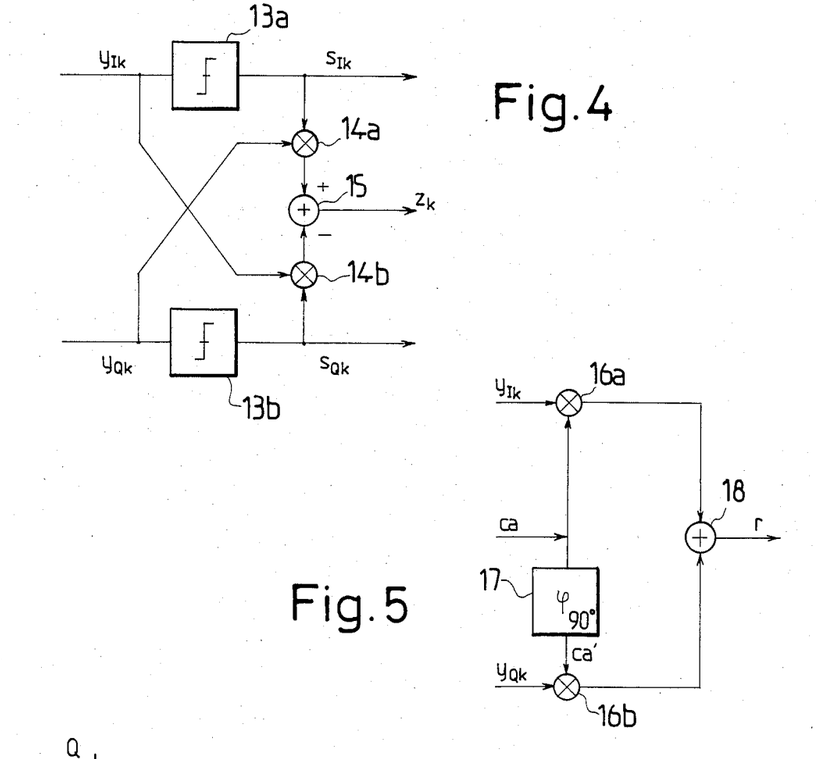
FIG. 4 is a block diagram of the detector 4, where the generation of the projection voltage $z_k$ can be seen.
FIG. 5 is a block diagram of the remodulator 6.

The contents of the detector block 4 are given in FIG. 4. The analog signals $y_{Ik}$ and $y_{Qk}$ are fed into threshold devices 13a and 13b, whose outputs are quantized detected symbols $s_{Ik}$ and $s_{Qk}$. The voltages $s_{Ik}$ and $s_{Qk}$ can have only discrete values due to the quantization in the threshold devices 13. For 4PSK these values might be e.g. $+1$ and $-1$ while the corresponding values for 16QAM could be e.g. $-3$, $-1$, $+1$, and $+3$. The key operation of the invention—calculation of projection voltage $z_k$—takes place in this block. The projection voltage is now derived through the operation $$z_k = y_{Qk} s_{Ik} - y_{Ik} s_{Qk} \tag{1}$$

The detected symbol $s_{Ik}$ is a positive or negative voltage, which has a constant value during each symbol interval of length T. The symbol voltage $s_{Ik}$ can only have a few discrete values depending on the modulation in use. Similarly the signal sample $y_{Qk}$ may be a negative or positive voltage but it is an analog voltage and, hence, all values are possible. Also the voltage $y_{Qk}$ is kept constant during the symbol interval T. These two voltages are fed to a DC-type multiplier 14a. This multiplier can be realized e.g. digitally by using analog-to-digital converters for voltages $y_{Qk}$ and $s_{Ik}$ and a digital multiplier. Equivalent operations are applied to obtain the product $y_{Ik}*s_{Qk}$. The products are fed to a summing circuit 15, which, for analog voltages, can be a resistor matrix and operational amplifier type or, in digital realization, a digital difference circuit. The output voltage $z_k$ may be an analog voltage or a digital voltage depending on the realization principle of the rest of the receiver. We also note that, independently of the implementation techniques of the receiver, the signal $z_k$ can be quantized to consist only a few discrete values, e.g., $+1$ and $-1$. The voltages $z_k$ can be used in the decision directed loop for carrier regeneration in block 5 according to the known principles.

Figure 6:
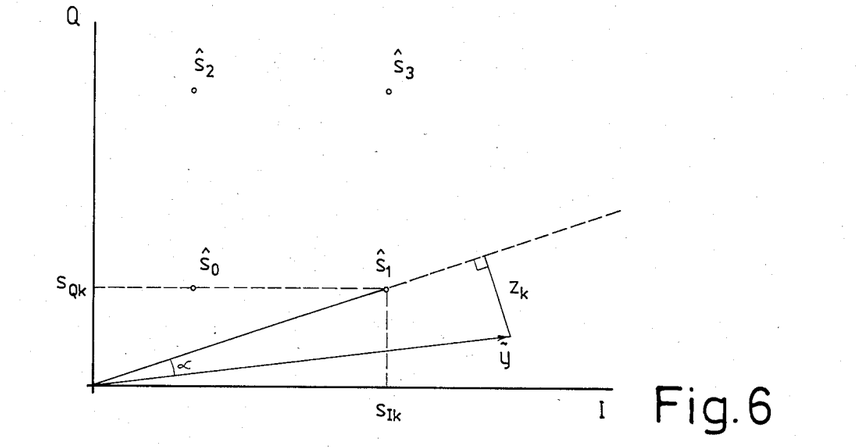
FIG. 6 is a diagram showing how the projection voltage $z_k$ is determined by means of the system of FIG. 4.

The main idea of the invention is to minimize the mean square error $E(\sin^2\alpha)$, where $\alpha$ is the deflection angle of the received signal sample $\bar{y}$ from the detected direction defined by the detected symbol $\bar{s}_k$, see FIG. 6. The received complex voltage $\bar{y}$ is here defined as $$\bar{y} = y_{Ik} + j y_{Qk} \tag{2}$$

and the detected complex symbols are denoted $\bar{s}_k$. FIG. 6 gives an example of the signal geometry for 16QAM-modulation. The first quadrant of the signal diagram is shown in the figure. The minimization of the mean square error can be approached by minimizing the mean square projection voltage and this latter minimization can be accomplished by the use of the gradient method. This leads to realizations of the kind given in FIG. 2.

The sum signals $y_{Ik}$ and $y_{Qk}$ are remodulated in block 6. The detailed structure of the remodulator is given in FIG. 5. The sum signal $y_{Ik}$ from the in-phase path is multiplied by the regenerated carrier voltage ca, from the block 5, in the multiplier 16a, which can be e.g. a balanced modulator. The signal $y_{Qk}$ from the quadrature path is multiplied by the regenerated quadrature carrier voltage ca', which is obtained through phase shifting the voltage ca by the 90 degrees phase shifter 17, in the multiplier 16b. The outputs of the said multipliers are summed in the summing circuit 18, which can be e.g. a linear operator amplifier circuit, yielding the remodulated sum signal r.

The projection voltage $z_k$ and the remodulated sum signal r are multiplied in the multiplier 7, which can be of balanced modulator type. The product voltage b from the multiplier 7 is fed to correlators $\text{Cor}_1, \ldots, \text{Cor}_{M-1}, (\text{Cor}_M)$. Each input signal $s_1, \ldots, s_{M-1}, (s_M)$ is correlated by the voltage b and the correlator output voltages $c_1, \ldots c_{M-1}, (c_M)$ are fed to the phase shifters $AP_1, \ldots, AP_{M-1}, (AP_M)$. The correlators can be realized e.g. by the use of wide band balanced modulators as multiplicators and averaging the multiplication result e.g. by means of low-pass filters.

The correlation results $c_m$ are used to control the amplitude and phase shifters $AP_1, \ldots, (AP_M)$ in such a way that the correlation results will be zero. One possible method to reach the said goal is to use the steepest descent or gradient method in controlling the amplitude and phase of the shifters. In such a control, voltages proportional to the amplitude and phase of the correlation results $c_m$ are subtracted from the amplitude and phase control voltages of the shifters $AP_1, \ldots, (AP_M)$. At the equilibrium the correlation results are zero and the control voltages of the shifters are no longer changed.

The receiver principle given in FIG. 2 can be modified to include only $M-1$ amplitude and phase shifters. One diversity branch can be left without such a shifter. This is due to the fact that the carrier regenerator 5 adapts the regenerated carrier phase to the phase of the combined signal. The missing amplitude control can be achieved by the use of automatic gain control (AGC), which in such a case would be common to all branches.

Figure 7:
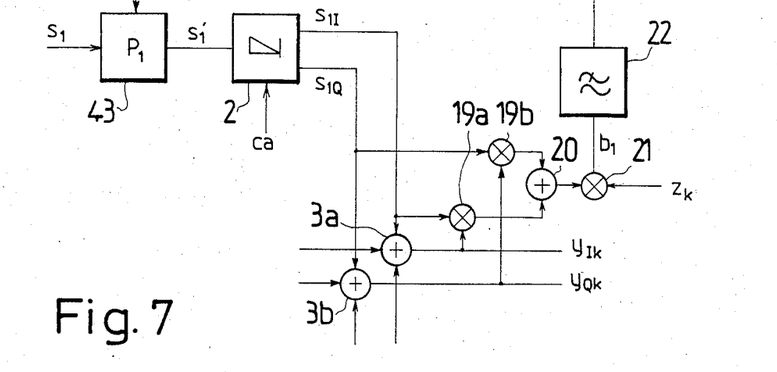
FIGS. 7 to 10 are block diagrams of alternative systems (phase shifters before demodulation).

Several modifications of the receiver principle presented above can be given. In the first category (FIGS. 7 to 10), the amplitude and phase shifters $AP_1, \ldots, (AP_M)$ are substituted by pure phase shifters $P_1, \ldots, (P_M)$, which cause only a phase shift to the signal going through them. In this case, the signals after the phase shifters should be multiplied by the complex conjugate of the combined signal and this product multiplied by the projection voltage $z_k$. The necessary operations are sketched in FIG. 7 for a receiver where the signals from each diversity branch and the combined signal are multiplied with each other in baseband form. In FIG. 7, the incoming signals $s_1, \ldots, (s_M)$ are fed through the phase shifters $P_1, \ldots, (P_M)$ to obtain the phase shifted signals $s_1', \ldots, (s_M')$. The shifted signals are demodulated in the demodulators 2 by means of the carrier wave ca. The demodulator outputs are the in-phase signals $s_{1I}, \ldots, s_{MI}$ and the quadrature signals $s_{1Q}, \ldots, s_{MQ}$. The in-phase signals are summed at the summing point 3a, giving the sum signal $y_{Ik}$ and the quadrature signals are summed at the summing point 3b, giving the sum signal $y_{Qk}$. The in-phase signal $s_{1I}$ is multiplied by the in-phase sum signal $y_{Ik}$ in the low-pass type multiplier 19a. Similarly, the quadrature signal $s_{1Q}$ is multiplied by the quadrature sum signal $y_{Qk}$ in the low-pass type multiplier 19b. The products are summed in the summing circuit 20, which can be realized e.g. by the aid of an operational amplifier. The sum signal is multiplied by the projection voltage $z_k$ realized as previously described, in the multiplier 21, which is of low-pass type. The output of the multiplier 21 is low-pass filtered in filter 22, whose bandwidth is much less than the reciprocal of the symbol length T. The low-pass filtered voltage $c_1$ is fed to the phase shifter $P_1$, whose phase shift is assumed to be proportional to the control voltage $c_1$. Similarly, all the other branches (or all but one) get the control voltages $c_2, \ldots c_M$ and the corresponding phase shifts. Hence, the optimum combining, when only phase shifters are used, is fulfilled.

Figure 8:
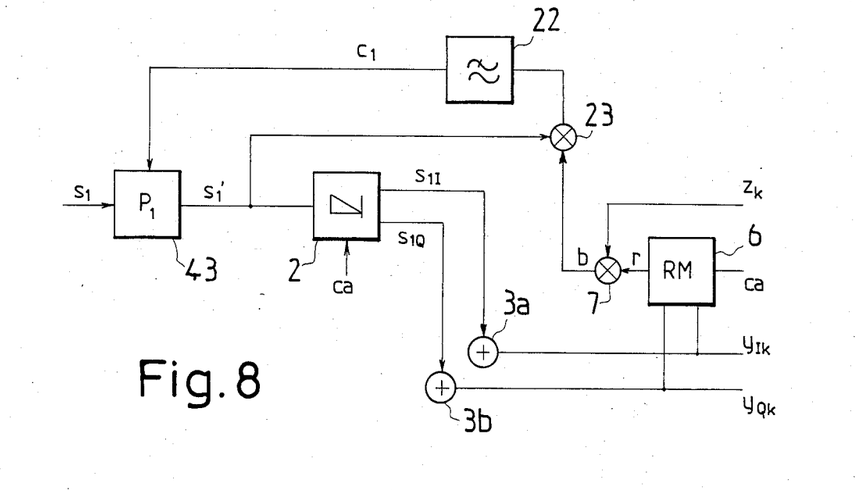

In FIG. 8, mathematically the same idea as in FIG. 7 is realized but with a slightly different physical structure. The sum signals $y_{Ik}$ and $y_{Qk}$ are obtained similarly to the previous block scheme. These signals are fed to the remodulator 6 whose output is the remodulated signal r. The signal r and the projection voltage $z_k$ generated as earlier, are fed to the multiplier 7, which is bandpass type e.g. a balanced mixer. The product voltage b is fed to another multiplier 23, which also is bandpass type, and is multiplied by the shifted signal $s_1'$. The product voltage is fed to a low-pass filter 22, whose output is the control voltage $c_1$ which is fed to the phase shifter $P_1$. The phase shift of the phase shifter $P_1$ is proportional to the voltage $c_1$. The control voltages for other diversity branches are formed equivalently.

Figure 9:
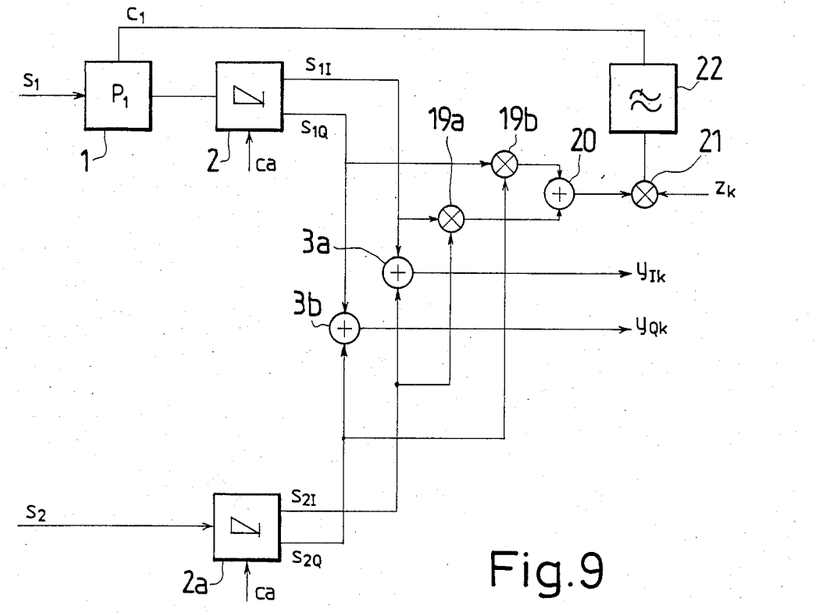

In FIG. 9, a modified structure applicable to two branch diversity only, is given. The control signal $c_1$ is now formed on the basis of branch signals alone, without the use of the sum signals. The in-phase and quadrature signals are formed via demodulation as before. The in-phase signal $s_{1I}$ from branch 1 is multiplied by the in-phase signal $s_{2I}$ from branch 2 in the multiplier 19a and the same is done for the quadrature signals $s_{1Q}$ and $s_{2Q}$ in the multiplier 19b. The products are fed to the summing circuit 20, whose output is multiplied by the projection voltage $z_k$ in the multiplier 21, which is low-pass type. The output of the multiplier 21 is fed to the low-pass filter 22, whose output is the control voltage $c_1$, which is fed to the phase shifter $P_1$. The phase shifter $P_1$ causes a phase shift proportional to the control voltage $c_1$ to the signal $s_1$ and, hence, the signals are optimally phased at the summing point.

Figure 10:
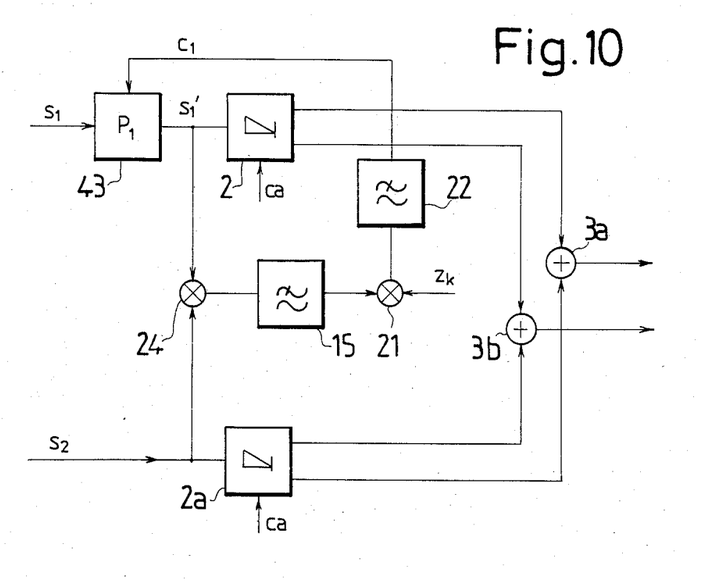

Mathematically, the same idea as in the block scheme of FIG. 9 can be realized by the block scheme in FIG. 10. The shifted signal $s_1'$ and the signal from the other diversity branch, $s_2$, are multiplied in the bandpass type multiplier 24, e.g. a balanced mixer, whose output is filtered in the low-pass filter 25, whose bandwidth is of the same order as the symbol rate (possibly a little wider bandwidth). The filtered signal is fed to the multiplier 21 and multiplied by the projection voltage $z_k$. The product is low-pass filtered by the filter 22, whose bandwidth is much less than symbol rate. The low-pass filtered voltage $c_1$ is used to control the phase shifter $P_1$ as before.

Figure 11:
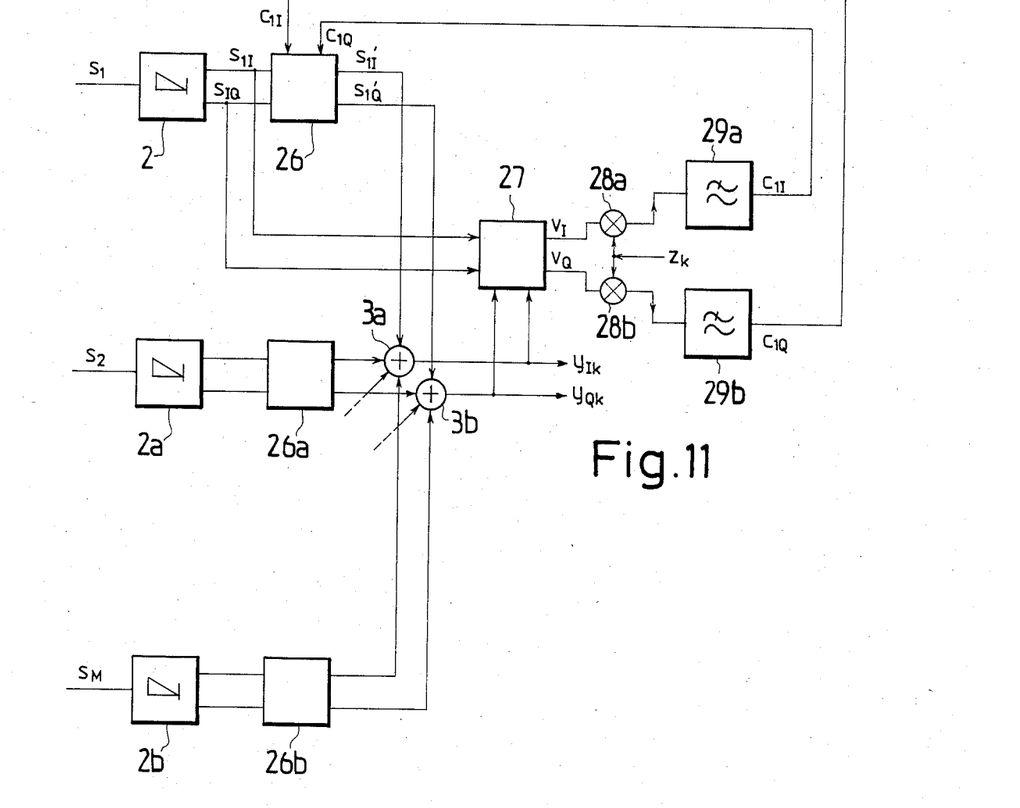
FIG. 11 is a block diagram of an alternative system (phase shifters after demodulation).
Figure 12:
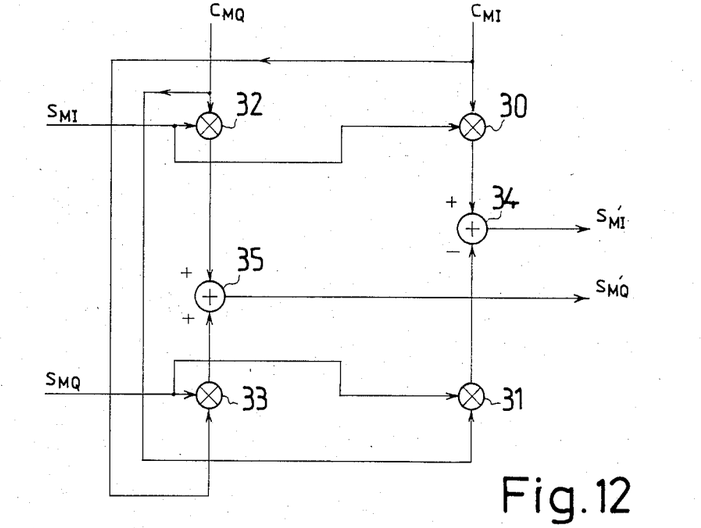
FIGS. 12 and 13 are detailed circuit diagrams of two blocks needed in the system of FIG. 11.
Figure 13:
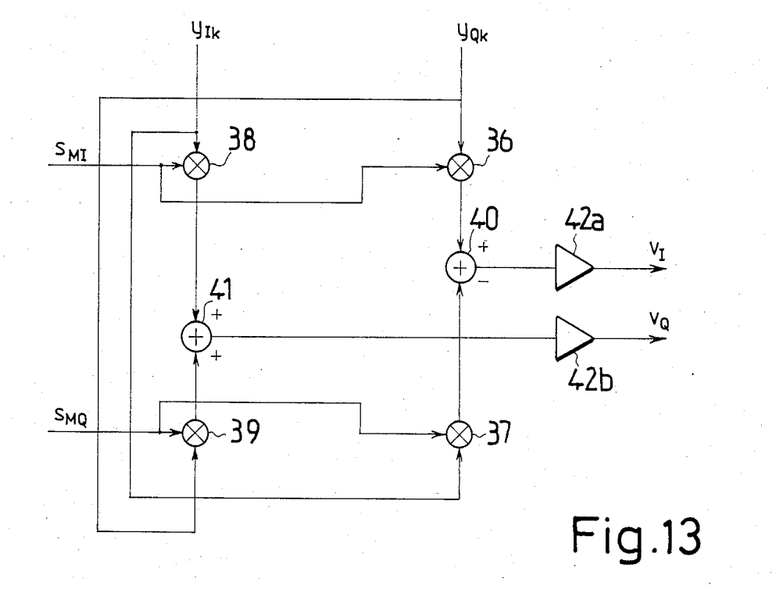

The second category of receiver structures (FIGS. 11 ... 13) is obtained when the phase shifts are generated after the demodulation. The basic block scheme for the receiver in this case is given in FIG. 11. The signals in the diversity branches $s_1, \ldots s_M$ are demodulated by the demodulators 2. The in-phase output signals $s_{1I}, \ldots, s_{MI}$ and the quadrature output signals $s_{1Q}, \ldots, s_{MQ}$ are fed to the baseband phase shifters 26.

The structure of the baseband amplitude and phase shifter is given in FIG. 12. The in-phase signal $s_{mI}$ from the branch m is multiplied by the control voltage $c_{mQ}$ in the low-pass type multiplier 32 and the product is fed to the summing circuit 35. Correspondingly, the quadrature signal $s_{mQ}$ is multiplied by the control voltage $c_{mI}$ in the multiplier 33 and the product is fed to the summing circuit 35. The output of the summing circuit is the shifted quadrature signal $s_{mQ}'$. The voltage $s_{mI}$ is also fed to an other multiplier 30 where it is multiplied by the control voltage $c_{mI}$ and the product is fed to the summing circuit 34. Correspondingly, the signal $s_{mQ}$ is also fed to another multiplier 31, where it is multiplied by the control voltage $c_{mQ}$ and the product is fed to the summing circuit 34. In the summing circuit 34, the difference voltage of the two inputs is formed and the resulting output is the shifted in-phase signal $s_{mI}'$.

The shifted signals are combined in the combining circuit 3 in the similar way as in the receiver of FIG. 2 to form the sum signals $y_{Ik}$ and $y_{Qk}$. These sum signals are processed as earlier to form the detected symbols $s_{Ik}$ and $s_{Qk}$ as well as the projection voltage $z_k$. In order to obtain the control voltages $c_{1I}$ and $c_{1Q}$, the demodulated signals $s_{1I}$ and $s_{1Q}$ are fed to the baseband phase comparator 27 together with the sum signals $y_{Ik}$ and $y_{Qk}$.

The structure of the baseband phase comparator is given in FIG. 13. The signal $s_{mI}$ is multiplied by the in-phase sum signal $y_{Ik}$ in the multiplier 38 and the product is fed to the summing circuit 41. Correspondingly, the signal $s_{mQ}$ is multiplied by the signal $y_{Qk}$ and the product is fed to the summing circuit 41. The output of the summing circuit is fed to the inverting amplifier 42b (voltage gain −1). The output of the inverting amplifier is denoted as $v_Q$. The signal $s_{mI}$ is also fed to another multiplier 36 where it is multiplied by the quadrature sum signal $y_{Qk}$ and the product is fed to the summing circuit 40. Correspondingly, the signal $s_{mQ}$ is also fed to another multiplier 37 where it is multiplied by the sum signal $y_{Ik}$ and the product is fed to the summing circuit 40 where the difference of the two input voltages is formed. The difference voltage is fed to the inverting amplifier 42a. The output of the inverting amplifier is denoted as $v_I$.

The output $v_I$ of the comparator circuit 27 is multiplied by the projection voltage $z_k$ in the multiplier 28a and the product is low-pass filtered in the filter 29a, whose bandwidth is much less than the reciprocal of the symbol length. The output of the filter 29a is the control voltage $c_{1I}$ and it is fed to the baseband phase shifter 26. Similarly, the output $v_Q$ of the comparator circuit 27 is multiplied by the projection voltage $z_k$ in the multiplier 28b and the product is low-pass filtered in the filter 29b. The output of the filter 29b is the control voltage $c_{1Q}$ and it is fed to the baseband phase shifter 26.

All the branches (or all but one) have the baseband amplitude and phase shifters described above and the control voltages $c_{2I}, \ldots, c_{MI}$ and $c_{2Q}, \ldots, c_{MQ}$ are generated equivalently to the method just explained. The receiver in FIG. 11 is operationally equivalent to the receiver in FIG. 2.

Figure 14:
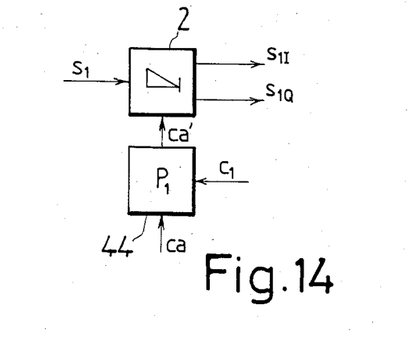
FIGS. 14 and 15 are alternative ways to realize the phase shifting in systems of FIGS. 7 to 10.

The third category to realize the principle of the invention is to generate the necessary phase shifts outside the signal path. One possibility is shown in FIG. 14. The remodulated reference carrier ca in every diversity branch (or in all but one) is fed into a phase shifter 44, which can now be of very narrow band type as the reference carrier is a sinusoidal of approximately fixed frequency. The phase shift caused by the phase shifter to the phase of the reference carrier is controlled by the voltage $c_1$ (and $c_2, \ldots, c_{M-1}, (c_M)$) which is generated by one of the methods described in FIGS. 7 ... 10. The output voltage ca' of the phase shifter 44 is fed to the demodulator 2 and used to demodulate the intermediate frequency signal $s_1$ ($s_2, \ldots, s_{M-1}, (s_M)$ in other diversity branches). The outputs of the demodulators are processed as described earlier.

Figure 15:
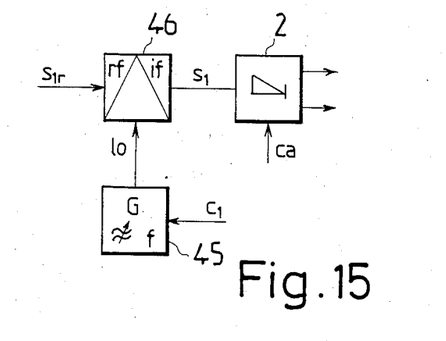

The second possibility of realization in the third category is to use the method shown in FIG. 15. The control voltage $c_1$ (and $c_2, \ldots, c_{M-1}, (c_M)$ in the other diversity branches) is used as a control voltage to a voltage controlled oscillator (VCO) 45. The generation of $c_1$ takes place by one of the methods described in FIGS. 7 ... 10. The output voltage lo of the VCO 45 is used in a mixer 46 to mix the rf-signal slr down in frequency into the if-signal $s_1$. The phase shift caused by the control voltage $c_1$ to the voltage lo is transferred by the mixing to the phase shift in the signal voltage $s_1$ as needed. The operation shown in FIG. 15 is done in every (or in all but one) diversity branch. One branch can be equipped with a fixed frequency oscillator if wanted.

The third possibility of realization in the third category is to use similar phase shifters 44 and control voltages as in FIG. 14 but arrange them to influence on the local oscillator voltages lo used in rf/if-mixing as in FIG. 15. In this case all the local oscillators 45 can be of fixed frequency type.

EXAMPLE

We give here a detailed description of the operation in one of the principles described in the general section. Consider a two branch diversity receiver in FIG. 16, where a pure phase shifter is used in the other branch only. This is a special case of the principle given in FIG. 7. Assume that four phase modulation (4PSK or QPSK) is used and that the channel is ideal and nondispersive. White Gaussian noise is present at both branches and these noises are uncorrelated. We adopt the complex envelope notation, (7, pp. 565 . . .), for conciseness.

Figure 16:
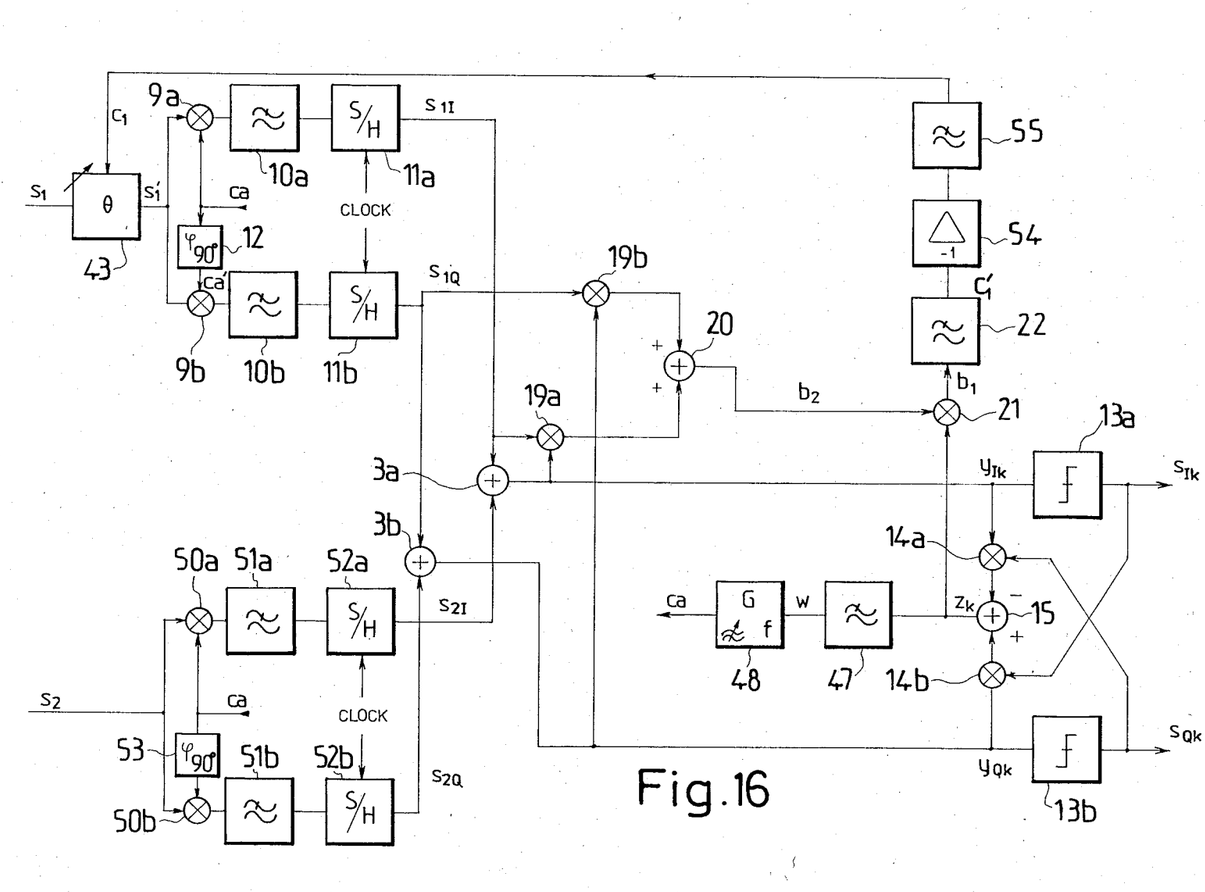
FIG. 16 is a block diagram of one system embodiment for carrying out the method according to the invention.

The input signal and noise for the diversity branch 1 are now $$s_1(t) = Re\{(\tilde{s}_k f(t) e^{j\theta_1} + \tilde{n}_1(t)) e^{j\omega_0 t}\} \quad (3)$$

where only the $k^{th}$ time interval is considered. The transmitted pulse waveform is $f(t)$, the noise is $\tilde{n}_1(t)$, $\theta_1$ is the phase difference between the two branches owing to the transmission channel, $\omega_0$ is the intermediate angle frequency, and the modulation is included into $\tilde{s}_k$ which is of the form $$\tilde{s}_k = s_{Ik} + j\, s_{Qk} \quad (4)$$

where $s_{Ik}$ and $s_{Qk}$ are allowed to have values $1/\sqrt{2}$ and $-1/\sqrt{2}$ (for 4 PSK). Correspondingly, the input signal for the diversity path 2 is given by $$s_2 = Re\{(\tilde{s}_k f(t) + \tilde{n}_2(t)) e^{j\omega_0 t}\} \quad (5)$$

with obvious notations.

The phase shifted signal $s_1'(t)$ after the phase shifter 43 is given by $$s_1'(t) = Re\{(\tilde{s}_k f(t) e^{j\theta_1} + \tilde{n}_1(t)) e^{j\omega_0 t + j\theta}\} \quad (6)$$

where $\theta$ is the phase shift of the phase shifter 43. The signal $s_1'$ is multiplied by the in-phase reference carrier ca at the multiplier 9a and by the quadrature reference carrier ca' at the multiplier 9b. These reference carriers are represented by formulae $$ca = Re\{e^{j\omega_0 t + j\rho}\} \quad (7)$$

$$ca' = Re\{j\, e^{j\omega_0 t + j\rho}\} \quad (8)$$

where $\rho$ is the phase of the reference carrier voltage.

The outputs of the multipliers are filtered by the low-pass filters 10a and 10b, whose impulse responses are denoted by $h(t)$. The low-pass filters eliminate the double frequency terms after the multiplication and only the low-pass type terms of the multiplication results get through to the sample and hold circuits 11a and 11b. The output pulse form after the low-pass filters 10a and 11b is the convolution of the input pulse form $f(t)$ and the impulse response $h(t)$ and this convolution result is denoted by $g(t)$. The input voltage to the sample and hold circuit 11a in the in-phase path is given by the formula $$s_{1I}(t) = K\, Re\{(\tilde{s}_k g(t) e^{j\theta + j\theta_1} + \tilde{N}_1(t) e^{j\theta}) e^{-j\rho}\} \quad (9)$$

where K includes the effect of the multiplier coefficient and $N_1 \exp(j\theta)$ is the low-pass filtered complex noise in the diversity branch 1. An analog sample of the continuous waveform $s_{1I}(t)$ is taken at time $(k+1)T$ at the sample and hold circuit 11a. This sampled voltage $s_{1I}$ is given by $$s_{1I} = K\, Re\{(\tilde{s}_k g(T) e^{j\theta + j\theta_1} + \tilde{N}_1(T) e^{j\theta}) e^{-j\rho}\} \quad (10)$$

Similarly, in the quadrature path, the output voltage of the sample and hold circuit 11b is given by $$s_{1Q} = K\, Im\{(\tilde{s}_k g(T) e^{j\theta + j\theta_1} + \tilde{N}_1(T) e^{j\theta}) e^{-j\rho}\} \quad (11)$$

The outputs from the diversity branch 2 can be evaluated in the similar way and these are given by $$s_{2I} = K\, Re\{(\tilde{s}_k g(T) + \tilde{N}_2(T)) e^{-j\rho}\} \quad (12)$$

and $$s_{2Q} = K\, Im\{(\tilde{s}_k g(T) + \tilde{N}_2(T)) e^{-j\rho}\} \quad (13)$$

The output voltages $s_{mI}$ and $s_{mQ}$ (m=1, 2) have constant values during each symbol interval of duration T. Their values may be changed only at the end of each symbol. Hence, the voltage waveforms to the summing point 3 are rectangular.

The in-phase voltages $s_{1I}$ and $s_{2I}$ are summed at the summing point 3a and the resulting voltage $Y_{Ik}$ is given by $$y_{Ik} = Re\{K(\tilde{s}_k(1 + e^{j\theta + j\theta_1}) g(T) + \tilde{N}_1 e^{j\theta} + \tilde{N}_2) e^{-j\rho}\} \quad (14)$$

Similarly, the sum voltage $y_{Qk}$ from the summing point 3b is $$y_{Qk} = Im\{K(\tilde{s}_k(1 + e^{j\theta + j\theta_1}) g(T) + \tilde{N}_1 e^{j\theta} + \tilde{N}_2) e^{-j\rho}\} \quad (15)$$

Now the projection voltage $z_k$ can be evaluated. For notational convenience the definition of Eq. (1) is re-written as $$z_k = Im\{\bar{y}\, \tilde{s}_k^*\} \quad (16)$$

where $\bar{y}$ is as given by Eq. (2) and the complex conjugate $s_k^*$ is given by $$\tilde{s}_k^* = s_{Ik} - j\, s_{Qk} \quad (17)$$

where $s_{Ik}$ and $s_{Qk}$ are the detected symbols at the output of threshold devices 13a and 13b. The output $s_{Ik}$ is $+1/\sqrt{2}$ if the input voltage is positive and $-1/\sqrt{2}$ if it is negative. With the above notation, one obtains $$z_k = Im\{K\tilde{s}_k^*(\tilde{s}_k(1 + e^{j\theta + j\theta_1}) g(T) + \tilde{N}_1 e^{j\theta} + \tilde{N}_2) e^{-j\rho}\} \quad (18)$$

Next, we shall consider the control voltage w at the input of the reference carrier VCO 48. The low-pass filter 47 is e.g. a RC-filter, whose time constant is large compared to the symbol length T. Thus the output w of this filter is effectively the average value of the input $z_k$. We obtain $$E\{z_k\} = Im\{K(E(\tilde{s}_k^*\tilde{s}_k)(1+e^{j\theta+j\theta_1})g(iT) + E(\tilde{s}_k^*\tilde{N}_1 e^{j\theta}) + E(\tilde{s}_k^*\tilde{N}_2))e^{-j\rho}\} \quad (19)$$

where $E(\ )$ denotes the statistical expectation (average value).

Assuming high signal-to-noise ratio, the receiver will make correct decisions most of the time and, hence, $\tilde{s}_k$ and $\bar{s}_k$ are the same. We get $$E\{\tilde{s}_k^*\tilde{s}_k\} = 1 \quad (20)$$

Furthermore, the noises and the transmitted symbols are uncorrelated and the average values are zero. Thus the noise terms in Eq. 19 are averaged to zero. We get $$w = E\{z_k\} = K\ g(T)\{\sin(\theta_1 + \theta - \rho) - \sin(\rho)\} \quad (21)$$

When this control voltage w is fed to the VCO 48, the phase $\rho$ is changed until the equilibrium is obtained, where the voltage w is zero. This is the known phase locked loop principle. At the equilibrium state we have (putting in Eq. (21) w=0)

$$\rho = \tfrac{1}{2}(\theta + \theta_1) \quad (22)$$

Now, the projection variable $z_k$ in Eq. (18) can be evaluated further. Substituting the value of $\rho$ in Eq. (22) into Eq. (18) we have $$z_k = Im\{K\ \tilde{s}_k^*(\tilde{N}_1 \exp(j\tfrac{1}{2}(\theta-\theta_1)) + \tilde{N}_2 \exp(-j\tfrac{1}{2}(\theta+\theta_1)))\} \quad (23)$$

The phase comparison needed for the generation of the control signal $c_1$, uses the outputs $s_{1I}$ and $s_{1Q}$ from the diversity branch 1 and the sum signals $y_{Ik}$ and $y_{Qk}$. The in-phase components and quadrature components are pairwisely multiplied in multipliers 19a and 19b, which should be of low-pass type and can be impemented e.g. digitally. The multiplier coefficient of multipliers 19 is denoted by $K_2$, a constant whose value is not important in the method. The outputs of the multipliers are fed to a summing circuit 20, which may be implemented e.g. by the use of operational amplifiers, and whose output voltage $b_2$ may be written as $$b_2 = K_2(s_{Ik}y_{Ik} + s_{Qk}y_{Qk}) \quad (24)$$

Using the results in Eqs. (9) to (15) into Eq. (24) and after some rearrangements one obtains $$b_2 = K_2K^2Re\{g^2(e^{j\theta+j\theta_1}+1) + \tilde{s}_k g\ e^{j\theta+j\theta_1}(\tilde{N}_1^* e^{-j\theta} + \tilde{N}_2^*) + \tilde{s}_k^*(e^{j\theta+j\theta_1}+1)^*g\ \tilde{N}_1 e^{j\theta} + |\tilde{N}_1|^2 + \tilde{N}_1\tilde{N}_2^* e^{j\theta}\} \quad (25)$$

where g is the shorthand notation for g(T).

The voltage $b_2$ is multiplied by the projection voltage $z_k$ in the multiplier 21, which also is of low-pass type, and the resulting product voltage $b_1$ is fed into the low-pass filter 22. The bandwidth of the low-pass filter is selected to be much less than the symbol rate and, hence, the filter 22 acts as an averaging filter. The output voltage $c_1'$ is approximately given by $$c_1' = K_3 E\{z_k b_2\} \quad (26)$$

where $K_3$ is a multiplier coefficient, $z_k$ is given by Eq. (18) and $b_2$ by Eq. (25). Assuming a high signal-to-noise ratio (and hence $\tilde{s}_k = \bar{s}_k$), recalling the uncorrelatedness of noises $\tilde{N}_1$ and $\tilde{N}_2$ as well as of the signal $\tilde{s}_k$, and assuming the carrier regenerator loop to be at its equilibrium state, we obtain $$c_1' = K_2K_3K^3g(\sigma_1^2+\sigma_2^2)\sin\tfrac{1}{2}(\theta+\theta_1) \quad (27)$$

where the variances $\sigma_1$ and $\sigma_2$ have been defined as $$E\{|N_i|^2\} = 2\sigma_i^2 \quad i=1,2 \quad (28)$$

Obviously the control signal $c_1'$ is zero when $\theta = -\theta_1$, which means that the information bearing parts of the signals $s_1'$ and $s_2$ are cophased (see Eqs. (5) and (6)). The stability of the equilibrium can be checked by letting $\theta$ have a minor change $\delta\theta$ from the value $-\theta_1$, i.e.

$$\theta = -\theta_1 + \delta\theta \quad (29)$$

The voltage $c_1'$ will now have a small positive value. The control voltage $c_1$ is obtained by inverting the sign of $c_1'$ in the inverter 54 (which may be an ordinary operational amplifier with gain $-1$) and integrating the result in the low-pass filter 55. Hence, the small positive value of $c_1'$ will cause a decrease in the voltage $c_1$ which, consequently, will lead to a decrease in the phase shift $\theta$ of the phase shifter 43 and the equilibrium is regained. The equilibrium value $\theta = -\theta_1$ is a stable point and leads to the wanted result where the information parts of the diversity signals will be cophased.

One should notice that the low-pass filter 55 is optional, whose function may be included into the filter 22. Also the location of the inverter 54 can be chosen to be elsewhere in the circuit e.g. in the $b_2$ generation or $z_k$ generation.

The analysis above conserns one special case in a nondispersive noisy channel. It was shown that by adopting the invention, one will have the information parts of the diversity signals cophased, which is the desired result. However, the greatest benefit of the invention is obtained when used in dispersive, multipath channels. The analysis of the receiver in such a case is utterly complex and is not presented here.

I claim:

1. A method for the reception and the detection of digital signals, comprising:
   receiving at least two signals ($s_1, s_2, \ldots, s_M$) having at least approximately the same information content, by means of at least one antenna or equivalent,
   generating out of each received signal ($s_i$), by means of a phase shift, and a demodulation, one in-phase baseband signal ($s_{iI}$) and one quadrature baseband signal ($s_{iQ}$),
   summing all in-phase baseband signals ($s_{iI}$) in a first summing point and all quadrature baseband signals ($s_{iQ}$) in a second summing point,
   feeding both sum signals ($y_{Ik}$ and $y_{Qk}$) to a detector (4) for detection and generating two detected output signals ($s_{Ik}$ and $s_{Qk}$), and
   generating a reference carrier (ca) as a function of said two sum signals ($y_{Ik}$ and $y_{Qk}$) for carrying out a coherent demodulation,
characterized by
   generating a projection voltage ($z_k$) defined by the following equation $$z_k = y_{Qk}\ s_{Ik} - y_{Ik}\ s_{Qk},$$

wherein $y_{Ik}$ is a signal sample in the in-phase branch before threshold decision in the detector, $y_{Qk}$ is the signal sample in the quadrature branch before decision, $s_{Ik}$ is the detected signal in the in-phase branch, and $s_{Qk}$ is the detected signal in the quadrature branch, generating a product signal (b) by multiplying the projection voltage ($z_k$) with a signal (r) being a function of said sum signals ($y_{Ik}$ and $y_{Qk}$), generating control voltages ($c_1, \ldots, c_M$) by correlating said product signal (b) with each received signal ($s_1, \ldots, s_M$), by means of correlators ($Cor_1, \ldots, Cor_M$), and controlling the phase shifts by means of said control voltages ($c_1, \ldots, c_M$).

2. A method as claimed in claim 1, characterized in that the shift operation is carried out before the demodulation.

3. A method as claimed in claim 1, characterized in that the shift operation is carried out after the demodulation.

4. A method claimed in claim 1, characterized in that the signal being a function of the sum signals ($y_{Ik}$ and $y_{Qk}$) is a remodulated signal (r) of the sum signals.

5. A method as claimed in claim 2, characterized in that the signal correlated with the product signal (b) is a shifted but not yet demodulated signal ($s'_1$).

6. A method as claimed in claim 2, characterized in that the phase shift in the coherent demodulation is carried out by shifting the phase of the carrier (ca).

7. A method as claimed in claim 1, characterized in that angle modulation, e.g., 2-, 4-, ..., n-phase modulation, is used as modulation method.

8. A method as claimed in claim 1, characterized in that combined angle and amplitude modulation, e.g., the QAM method, is used as a modulation method.

9. A method as claimed in claim 1, characterized in that all signals but one ($s_1, s_2, \ldots, s_{M-1}$) are subjected to the phase shift.

10. A method as claimed in claim 3, characterized in that the phase shift in the coherent demodulation is carried out by shifting the phase of the carrier (ca).

11. A method for the reception and the detection of digital signals, comprising:

receiving at least two signals ($s_1, s_2, \ldots, s_M$) having at least approximately the same information content, by means of at least one antenna or equivalent, generating out of each received signal $s_i$, by means of a phase shift, an amplitude shift, and a demodulation, one in-phase baseband signal ($s_{iI}$) and one quadrature baseband signal ($s_{iQ}$), summing all in-phase baseband signals ($s_{iI}$) in a first summing point and all quadrature baseband signals ($s_{iQ}$) in a second summing point, feeding both sum signals ($Y_{IK}$ and $Y_{Qk}$) to a detector (4) for detection and generting two detected output signals ($s_{Ik}$ and $s_{Qk}$), and generating a reference carrier (ca) as a function of said two sum signals ($Y_{Ik}$ and $Y_{Qk}$) for carrying out a coherent demodulation, characterized by generating a projection voltage ($z_k$) defined by the following equation $$z_k = Y_{Qk} s_{Ik} - Y_{Ik} s_{Qk},$$

wherein $Y_{Ik}$ is a signal sample in the in-phase branch before threshold decision in the detector, $Y_{Qk}$ is the signal sample in the quadrature branch before decision, $s_{Ik}$ is the detected signal in the in-phase branch, and $s_{Qk}$ is the detected signal in the quadrature branch, generating a product signal (b) by multiplying the projection voltage ($z_k$) with a signal (r) being a function of said sum signals ($Y_{Ik}$ and $Y_{Qk}$), generating control voltages ($c_1, \ldots, c_M$) by correlating said product signal (b) with each received signal related to ($s_1, \ldots, s_M$) by means of correlators ($Cor_1, \ldots, Cor_M$), and controlling the phase shifts or the phase and amplitude shifts by means of said control voltages ($c_1, \ldots, c_M$).

* * * * *